United States Patent
Dymerski et al.

(10) Patent No.: US 6,533,235 B1
(45) Date of Patent: Mar. 18, 2003

(54) TWISTED END INTERFERENCE FIT FLEX SHAFT

(75) Inventors: Anthony Dymerski, Plymouth, MI (US); Sam Reddypogu, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/578,615

(22) Filed: May 25, 2000

(51) Int. Cl.[7] ................................................ F16M 13/00
(52) U.S. Cl. ........................ 248/429; 248/421; 403/383
(58) Field of Search ................................. 248/429, 430, 248/424, 421, 422; 403/361, 383; 464/52, 173, 183, 57, 180

(56) References Cited

U.S. PATENT DOCUMENTS

| | | |
|---|---|---|
| 1,871,528 A | 8/1932 | Joline |
| 2,409,385 A | 10/1946 | Pletcher |
| 2,588,018 A | 3/1952 | Lauenstein |
| 2,590,169 A | 3/1952 | Fritz |
| 2,969,660 A | 1/1961 | Dale et al. |
| 3,604,716 A * | 9/1971 | Webert .................... 277/26 |
| 4,541,160 A | 9/1985 | Roberts |
| 4,915,340 A | 4/1990 | Nawa et al. |
| 4,971,267 A | 11/1990 | Fulton et al. |
| 5,085,564 A | 2/1992 | Naylor et al. |
| 5,144,849 A | 9/1992 | Aihara et al. |
| 5,273,242 A * | 12/1993 | Mouri et al. ............... 248/429 |
| 5,314,158 A * | 5/1994 | Mouri .......................... 248/429 |
| 5,456,439 A | 10/1995 | Gauger |
| 5,558,578 A * | 9/1996 | Uryu et al. .................. 464/52 |
| 5,573,219 A * | 11/1996 | Chinomi ..................... 248/421 |
| 5,791,622 A | 8/1998 | Gauger |
| 5,823,499 A | 10/1998 | Ito et al. |
| 5,829,727 A * | 11/1998 | Chinomi et al. ........... 248/429 |
| 5,987,287 A * | 11/1999 | Huang ......................... 399/265 |

* cited by examiner

Primary Examiner—Ramon O. Ramirez
Assistant Examiner—A. Joseph Wujciak, III
(74) Attorney, Agent, or Firm—Bill C. Panagos

(57) ABSTRACT

A flexible shaft is provided having at least one end portion connectable to a socket. The at least one end portion has a substantially uniform cross-section defining at least one generally flat side. The flat sides of adjacent cross-sections collectively define a non-planar surface which is twisted about a reference axis for rotationally driving a cooperating planar surface in the corresponding socket.

12 Claims, 2 Drawing Sheets

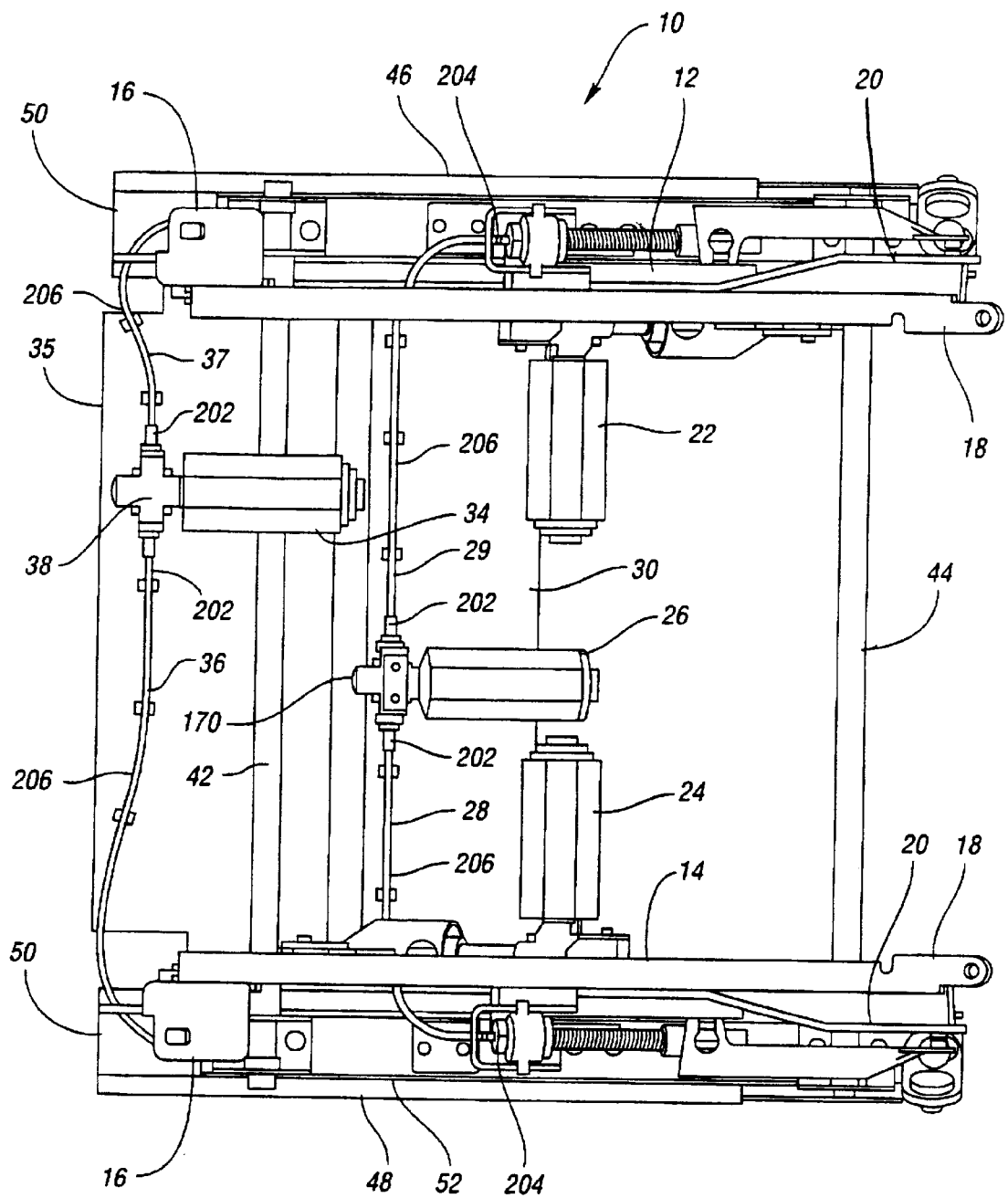

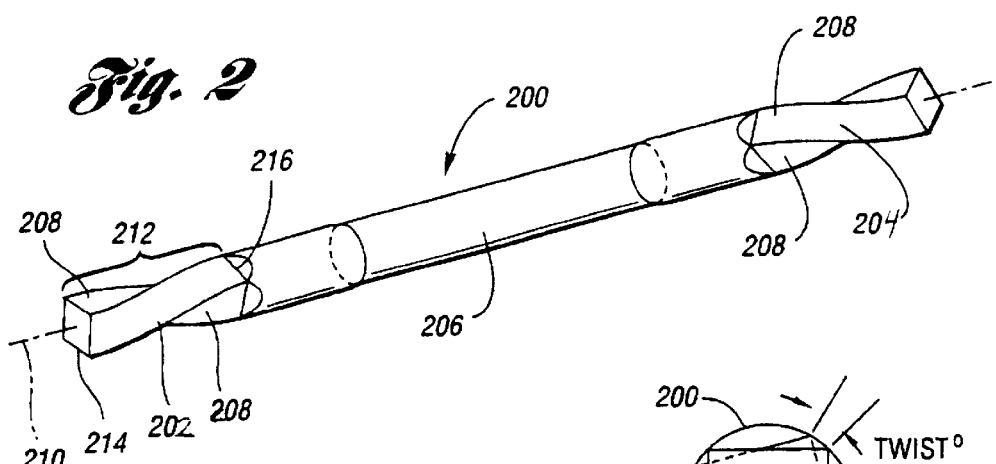
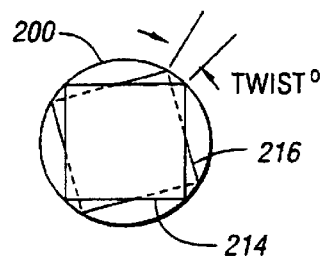
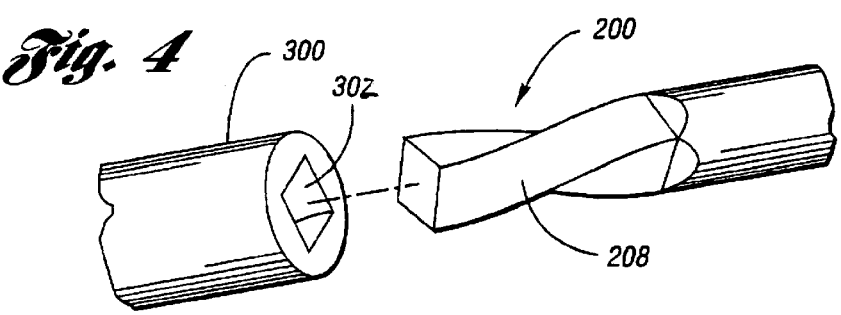
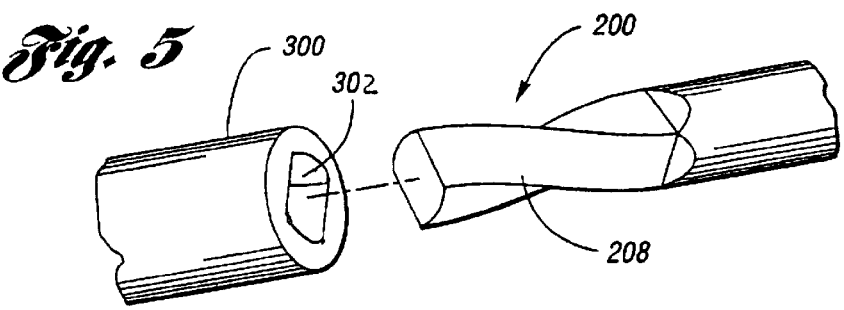
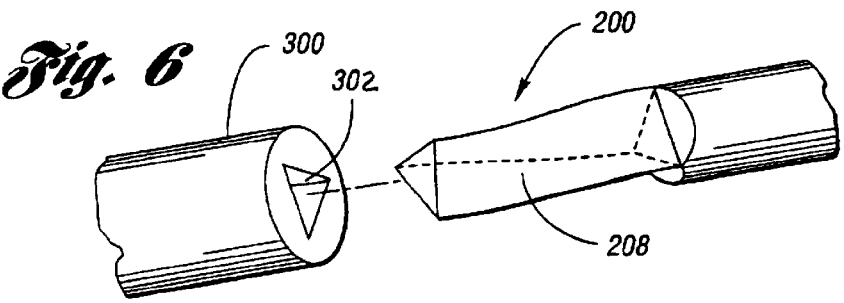

TWISTED END INTERFERENCE FIT FLEX SHAFT

TECHNICAL FIELD

The present invention relates to flexible shafts for transmitting rotational torque between a driving member and a driven member.

BACKGROUND ART

Power seats are a popular option on many vehicles sold today. The power seats typically are adjustable in the horizontal fore and aft and vertical directions as well as the seat back recliner movement to accommodate occupants of different height and size as well as to provide comfortable seating position to suit each occupant's preferences.

Power seats typically have a frame for supporting a seat bottom cushion and a seat back cushion. The seat frame is mounted on a first and second spaced track assemblies each having an upper track which is connected to the seat support frame and which is slidably mounted on a lower track anchored to the vehicle floor. A drive mechanism typically includes a bidirectional motor which rotates a pair of drive shafts extending outwardly from the motor to a gear box mounted on each upper track. Typically, each gear box engages a lead screw extending longitudinally below each upper track. A drive block is mounted to each lower track and threadingly receives the lead screw to cause reciprocal, horizontal movement of the upper track and the attached seat frame upon selective activation of the drive motor.

Similar drive mechanisms are provided for vertical adjustment of the seat support frame and for angular adjustment of the seat back. The vertical drive mechanisms may also include front and rear edge drive mechanisms for selectively tilting the front and rear edges of the seat bottom independent of each other as well as simultaneously to raise and lower the entire seat or, in some applications only the seat bottom.

Each vertical and recliner drive mechanism includes a drive motor having a rotatable output shaft connected to a gear assembly either directly in the case of front and rear vertical drive mechanisms or by means of two shafts extending from a single motor to separate gear assemblies mounted on each upper track or on the seat support frame in the case of a seat recliner drive mechanism.

In order to span the many possible mounting locations, it is common to employ flexible cable formed of a wound stranded wire coupled at opposite ends to the drive motor or motor gear box and the lead screw gear box. The rotating cable is surrounded by a stationary flexible outer sheath or cover. A special retention device such as ferrule is disposed at each end of the cable housing cover to secure the cover to the respective gear box or motor.

While the use of this flex cable, motor and gear box arrangements has proven to work for its intended purpose, problems still exist. For example, excessive noise is generated at the flex cable ends and socket interface. The noise is generated by the surface of flex shaft ends contacting the inner surface of the socket.

Thus it would be desirable to provide a power seat adjuster which overcomes the problems associated with previous power seat adjusters using flexible drive cables. It would also be desirable to reduce objectionable noise generated by the engagement of the cable end surfaces with the inside surface of the sockets during activation of the motor.

DISCLOSURE OF INVENTION

In accordance with an aspect of the present invention a flexible shaft is provided having at least one end portion connectable to a socket. The at least one end portion has a substantially uniform cross-section defining a non-planar surface which is twisted about a reference axis for rotationally driving a cooperating planar surface in the corresponding socket.

In accordance with another aspect of the present invention the at least one end portion of the flexible shaft has a polygonal cross-section.

In accordance with another aspect of the present invention at least one end portion of the flexible shaft has a square cross-section.

In accordance with another aspect of the present invention the non-planar surface of the at least one end portion is twisted between 10 and 30 degree about the reference axis over an insertion length of the flexible shaft.

In accordance with another aspect of the present invention the flexible shaft is comprised of a plurality of steel strands wound about a center core.

In accordance with yet another aspect of the present invention, an assembly comprising a flexible shaft having at least one end portion and a socket for cooperating with the at least one end portion is provided. The at least one end portion has a substantially uniform cross-section defining a non-planar surface which is twisted about a reference axis for rotationally driving a cooperating planar surface in the socket.

In accordance with still another aspect of the present invention a power seat including a motor having a motor output for displacing a driven member, a gear mechanism having a gear mechanism input for transmitting a rotational torque from the motor to the driven member, a flexible drive shaft having at least one end portion for connecting to a socket associated with the at least one of the motor output and gear mechanism input, the at least one end portion has a substantially uniform cross-section defining a non-planar surface which is twisted about a reference axis for rotationally driving a cooperating planar surface in the corresponding socket.

The above features, benefits and advantages and other features, benefits and advantages of the present invention are readily apparent from the following detailed description of the best mode for carrying out the invention when taken together with the accompanying drawings.

BRIEF DESCRIPTION OF DRAWINGS

FIG. 1 is a top view of a automobile seat adjuster assembly, in accordance with the present invention;

FIG. 2 is a perspective view of a flexible drive shaft for use in the automobile seat adjuster assembly, in accordance with the present invention;

FIG. 3 is a end view of the flexible drive shaft for use in the automobile seat adjuster assembly, in accordance with the present invention;

FIG. 4 is a perspective view of a socket having a generally square cross-section which cooperates with the flexible drive shaft, the flexible drive shaft has a generally square cross-section, in accordance with the present invention;

FIG. 5 is a perspective view of a socket having a double d-shaped cross-section which cooperates with the flexible drive shaft, the flexible drive shaft has a double d-shaped square cross-section, in accordance with the present invention; and FIG. 6 is a perspective view of a socket having a generally triangular cross-section which cooperates with the flexible drive shaft, the flexible drive shaft has a generally a triangular cross-section, in accordance with the present invention.

BEST MODE FOR CARRYING OUT THE INVENTION

Referring now to FIG. 1 there is illustrated an exemplary power seat adjuster 10 which variably positions an automotive vehicle seat in any occupant selected position. The power seat adjuster 10 is a so-called "eight way" adjuster providing horizontal fore and aft, vertical up and down, and independent movement of each of the front and rear edges of the seat, as well as pivotal tilting of a seat back with respect to a seat bottom of the vehicle seat. It will be understood, however, that the present invention described hereinafter may be used with a power seat adjuster which includes only one of such movements or adjustments, such as a horizontal fore and aft movement by itself or in combination with any number of the other such movements. It will also be understood that the power seat adjusters having a different configuration from that shown in FIG. 1 may also be used with the present invention. Moreover, it will also be understood that the present invention may be used in other systems besides power seat adjusters.

Typically, the power seat adjuster 10 supports a conventional vehicle seat (not shown) which includes a seat bottom or cushion and a seat back. A seat support frame is provided on the power seat adjuster 10 for supporting and connecting the seat bottom and the seat back to the power seat adjuster 10. The seat support frame includes a pair of spaced, longitudinally extending frame members or rails 12 and 14. A pair of mounting brackets 16 are mounted on the front end and a mounting surface 18 is formed at the rear end of the frame members 12 and 14 to provide a mounting surface for connecting a seat bottom and a seat back to the support frame. It will be understood that in lieu of the frame members 12 and 14, suitable mounting brackets may be provided on the power seat adjuster 10 for direct attachment of a seat bottom of a vehicle seat to power seat adjuster 10. A pair of seat back pivot brackets 20 are mounted on each of the frame members 12 and 14 and provide a pivot connection to the seat back (not shown) to permit selective tilting or pivotal movement of the seat back with respect to the seat bottom.

Various drive assemblies are mounted on the power seat adjuster 10 to provide selective movement of the power seat adjuster along various axises. For example, front and rear vertical drive motors 22 and 24, respectively, are mounted on the power seat adjuster 10 and connect to conventional lead screws and drive blocks or nuts to independently elevate front and rear edges of the seat support frame members 12 and 14, respectively, and thereby to provide selective vertical adjustment of the front and rear edges of the vehicle seat. In addition, a seat back recliner drive motor 26 drives a pair of rotatable flexible drive shafts 28 and 29 which are coupled to individual lead screws. Each lead screw is connected by a drive link to one of the seat back pivot brackets 20 mounted on opposite sides of the power seat adjuster 10 to provide selective pivotal adjustment of the seat back with respect to the seat bottom of the vehicle seat mounted on the seat support frame members 12 and 14.

The power seat adjuster 10 also includes a horizontal drive means formed of a bidirectional electric motor 34 which is supported by a motor mounting bracket 35 fixedly attached at opposite ends to each upper track of the power seat adjuster 10. A pair of rotatable flexible drive shafts 36 and 37 extend outward from the gear assembly or box 38 integrally connected to the output shaft of the drive motor 34 to a rotatable connection with a lead screw disposed in each of a pair of opposed track assemblies 46 and 48.

The power seat adjuster 10 also includes front and rear tubular torsion tubes or rods 42 and 44, respectively, which extend between and are connected to opposed track assemblies denoted generally by reference numerals 46 and 48 to provide a rigged support structure for the power seat adjuster 10.

Each track assembly 46 and 48 includes a lower track 50 and an upper track 52. The upper track 52 is slidably coupled to the lower track 50 and it is reciprocatingly, bidirectionally moveable along lower track 50 under the control of the electric motor 34.

The horizontal drive motor 34 has a rotatable output shaft, (not shown) which rotates in either of two directions depending upon the direction of current flow to the motor 34. The gear box 38 is integrally formed as part of the motor 34 and is connected to the output shaft of the motor 34. The gear box 38 converts rotation of the output shaft of the motor 34 to rotation of the two flexible drive shafts 36 and 37. The gear box 38 may also be mounted separate from the motor 34 while still being coupled to the output shaft of the motor 34. A suitable gear reduction may be implemented by the gear box 38 so as to provide a low speed of rotation with high torque to the drive shafts 36 and 37.

As shown in FIG. 1, each of the drive shafts 28, 29, 36 and 37 are preferably in the form a flexible cable having a helical wound steel core surrounded by a protective outer covering or sheath. Each of the flexible drive shafts are formed with a first axial end portion 202 and second axial end portion 204 which are interconnected by intermediate portion 206. The first axial end portion 202 of drive shaft is coupled to the motor or to the motor via a gear box 38 or 170. The second axial end portion 204 is coupled to a driven member or a lead screw.

A bearing block is mounted through an aperture formed in a top wall of the upper track 52 and extends through the upper track 52 into the interior space formed between the upper track 52 and the lower track 50. Enlarged flanges are formed on two ends of the bearing block and receive fasteners, such as rivets, which extend through each mounting flange into the top wall of the upper track 52 to fixedly mount the bearing block to the upper track 52. An internal, smooth bore extends through the bearing block and rotatably receives the fixed connection between a narrowed down necked portion at the second axial end of the drive shaft 36 and the neck portion at the first end of the lead screw or driven shaft alternatively a separate gear assembly or box may be mounted on one end of the lead screw. The gear assembly or box includes a gear mounted on the end of the lead screw which is engaged by a worm gear mounted on the end of the drive shaft 36. In this manner, rotation of the drive shaft 36 results in simultaneous rotation of the lead screw.

Although not shown in FIG. 1, a drive block is employed to transfer rotation of the driven shaft or lead screw to translate of the upper track 52 in a horizontal forward or aft direction with respect to lower track 50 upon selective activation of the horizontal drive motor 34. A threaded bore extends through the drive block and threadingly engages the lead screw. The drive block is movable with and fixedly mounted to the lower track 50. Since the lead screw, horizontal drive motor 34 and flex drive cable 36 are mounted to and moveable with the upper track 52, rotation of lead screw through the drive blocks results in horizontal fore and aft translation of the upper track 52 with respect to the lower track 50 in a conventional manner.

As shown in FIG. 2 flexible drive shaft 200, which is representative of drive shafts 28, 29, 36, and 37 shown in FIG. 1, is illustrated having a unique first and second axial end portions 202 and 204, in accordance with the present invention. The first and second axial end portions 202 and 204 are formed from a narrowed down smaller diameter neck portion which has a square shape to slidably and non-rotatably fit within a complimentary shaped bore or socket 300, as shown in FIG. 4. Socket 300 is integrally formed in an output shaft of the motor gear box 38 and 170 and a like socket 300 is integrally formed in the driven member. Preferably, the driven member is a conventional, externally threaded lead screw extending along the track assembly 48.

First and second axial end portions may have a polygonal, d-shaped, or double d-shaped cross-sections (as shown in FIGS. 4 through 6). However, when the first and second axial end portions are formed the forming operation creates a twist such that surfaces 208 are rotated about a reference axis 210. Preferably, the surfaces are rotated between 10 and 20 degrees over an insertion length 212. The insertion length is the length of the axial end portion 202 or 204 which is inserted into the socket 300.

Referring now to FIG. 3 an end view of the flexible drive shaft 200 is illustrated in accordance with the present invention. As shown the twist angle is measured by comparing an end edge 214 of the axial end portion 202 or 204 to an inner edge 216 of the axial end portion. The preferred twist angle is between 10 and 20 degrees.

In operation, the drive shaft 200 is positioned within the socket 300 causing the non-planar surface 20 of the axial end portions 202 and 204 to interfere with the interior surfaces of aperture 302 of the socket 300. Since the drive shaft is constructed of a plurality of wound steel strands, the axial end portions when inserted into the socket 300 tend to "spring" toward their preformed non-planar shape. Thus, the non-planar surfaces 208 of the axial end portions remain in constant contact with the interior surfaces of the aperture 302 in socket 300 eliminating noise caused, in prior art drive shaft and socket assemblies, by periodic contacting of such cooperating surfaces.

The advantages and benefits of the present invention are many. For example, the unique drive shaft of the present invention eliminates noise at the drive shaft and socket interface. Moreover, the present invention solves the noise problem without adding cost to the flexible drive shaft.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A flexible shaft having at least one end portion connectable to a socket, the at least one end portion has a substantially uniform cross-section defining a non-planar surface which is twisted about a reference axis for rotationally driving a cooperating planar surface in the corresponding socket, the flexible shaft having a helically wound core that rotationally biases the at least one end portion in the corresponding socket so that the non-planar surface remains in contact with the cooperating planar surface in the corresponding socket to reduce vibration and noise.

2. The flexible shaft of claim 1, wherein the at least one end portion has a polygonal cross-section.

3. The flexible shaft of claim 2, wherein the at least one end portion has a square cross-section.

4. The flexible shaft of claim 1, wherein the non-planar surface is twisted between 10 and 20 degree about the reference axis over an insertion length of the flexible shaft.

5. An assembly comprising:

a flexible shaft having at least one end portion; and a socket for cooperating with the at least one end portion, the at least one end portion has a substantially uniform cross-section defining a non-planar surface which is twisted about a reference axis for rotationally driving a cooperating planar surface in the socket, the flexible shaft having a helically wound core that rotationally biases the at least one end portion in the corresponding socket so that the non-planar surface remains in contact with the cooperating planar surface in the corresponding socket to reduce vibration and noise.

6. The assembly of claim 5, wherein the at least one end portion has a polygonal cross-section.

7. The assembly of claim 6, wherein the at least one end portion has a square cross-section.

8. The assembly of claim 6, wherein the non-planar surface is twisted between 10 and 20 degrees about the reference axis over an insertion length of the flexible shaft.

9. A power seat, comprising:

a motor having a motor output for displacing a driven member;

a gear mechanism having a gear mechanism input for transmitting a rotational torque from the motor to the driven member;

a flexible drive shaft having at least one end portion for connecting to a socket associated with the at least one of the motor output and gear mechanism input, the at least one end portion has a substantially uniform cross-section defining a non-planar surface which is twisted about a reference axis for rotationally driving a cooperating planar surface in the corresponding socket, the flexible shaft having a helically wound core that rotationally biases the at least one end portion in the corresponding socket so that the non-planar surface remains in contact with the cooperating planar surface in the corresponding socket to reduce vibration and noise.

10. The power seat of claim 9, wherein the at least one end portion has a polygonal cross-section.

11. The power seat of claim 10, wherein the at least one end portion has a square cross-section.

12. The power seat of claim 9, wherein the non-planar surface is twisted between 10 and 20 degree about the reference axis over an insertion length of the flexible shaft.

* * * * *

UNITED STATES PATENT AND TRADEMARK OFFICE
CERTIFICATE OF CORRECTION

PATENT NO.    : 6,533,235 B1                                        Page 1 of 1
DATED         : March 18, 2003
INVENTOR(S)   : Anthony Dymerski et al.

It is certified that error appears in the above-identified patent and that said Letters Patent is hereby corrected as shown below:

<u>Column 6,</u>
Lines 13 and 59, delete "degree", and insert -- degrees -- therefor.

Signed and Sealed this

Thirteenth Day of May, 2003

JAMES E. ROGAN
*Director of the United States Patent and Trademark Office*